US010899917B2

(12) United States Patent
Bossolo et al.

(10) Patent No.: US 10,899,917 B2
(45) Date of Patent: Jan. 26, 2021

(54) FLUOROELASTOMER COMPOSITION

(71) Applicant: SOLVAY SPECIALTY POLYMERS ITALY S.P.A., Bollate (IT)

(72) Inventors: Stefano Bossolo, Parabiago (IT); Claudia Manzoni, Bologna (IT); Matteo Fantoni, Vanzaghello (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 0 days.

(21) Appl. No.: 16/345,228

(22) PCT Filed: Oct. 26, 2017

(86) PCT No.: PCT/EP2017/077443
§ 371 (c)(1),
(2) Date: Apr. 25, 2019

(87) PCT Pub. No.: WO2018/078015
PCT Pub. Date: May 3, 2018

(65) Prior Publication Data
US 2019/0276655 A1 Sep. 12, 2019

(30) Foreign Application Priority Data
Oct. 27, 2016 (EP) .................................... 16196062

(51) Int. Cl.
*C08L 27/12* (2006.01)
*C08K 5/14* (2006.01)
*C08K 5/21* (2006.01)
*C08K 5/3492* (2006.01)

(52) U.S. Cl.
CPC ................ *C08L 27/12* (2013.01); *C08K 5/14* (2013.01); *C08K 5/21* (2013.01); *C08K 5/3492* (2013.01); *C08L 2312/00* (2013.01); *C08L 2312/02* (2013.01)

(58) Field of Classification Search
CPC ...... C08K 5/21; C08K 5/3492; C08K 5/0025; C08K 5/14; C08L 27/12; C08L 71/02; C08L 2312/02; C08L 2312/00
See application file for complete search history.

(56) References Cited

U.S. PATENT DOCUMENTS

| | | |
|---|---|---|
| 3,810,874 A | 5/1974 | Mitsch et al. |
| 4,035,565 A | 7/1977 | Apotheker et al. |
| 4,243,770 A | 1/1981 | Tatemoto et al. |
| 4,281,092 A | 7/1981 | Breazeale |
| 4,564,662 A | 1/1986 | Albin |
| 4,647,413 A | 3/1987 | Savu |
| 4,694,045 A | 9/1987 | Moore |
| 4,943,622 A | 7/1990 | Naraki et al. |
| 5,173,553 A | 12/1992 | Albano et al. |
| 5,447,993 A | 9/1995 | Logothetis |
| 5,545,693 A | 8/1996 | Hung et al. |
| 5,789,489 A | 8/1998 | Coughlin et al. |
| 6,984,759 B2 | 1/2006 | Di Meo et al. |
| 2004/0236028 A1* | 11/2004 | Hung et al. .......... C08F 214/18 525/326.2 |
| 2012/0009438 A1 | 1/2012 | Dams et al. |
| 2019/0276654 A1* | 9/2019 | Bossolo et al. .......... C08K 5/01 |

FOREIGN PATENT DOCUMENTS

| | | |
|---|---|---|
| EP | 0136596 A2 | 4/1985 |
| EP | 0199138 A2 | 10/1986 |
| EP | 0410351 A1 | 1/1991 |
| EP | 0708797 A1 | 5/1996 |
| EP | 860436 A1 | 8/1998 |
| WO | 1997005122 A1 | 2/1997 |
| WO | 2001027194 A1 | 4/2001 |

* cited by examiner

*Primary Examiner* — Nathan M Nutter
(74) *Attorney, Agent, or Firm* — Osha Bergman Watanabe & Burton LLP

(57) ABSTRACT

The invention pertains to a dual cure fluoroelastomer composition including certain nitrile-containing fluoropolyether compounds, able to provide for cured parts having improved thermal and water vapour resistance, to a method of curing the same and to cured articles obtained therefrom.

20 Claims, No Drawings

FLUOROELASTOMER COMPOSITION

CROSS-REFERENCE TO RELATED APPLICATION

This application is a U.S. national stage entry under 35 U.S.C. 071 of International Application No. PCT/EP2017/077443 filed Oct. 26, 2017, which claims priority to European application No. EP 16196062.0 filed on Oct. 27, 2016. The entire contents of these applications are explicitly incorporated herein by this reference.

TECHNICAL FIELD

The invention pertains to a fluoroelastomer composition able to provide for cured parts having improved thermal and steam resistance, to a method of curing the same and to cured articles obtained therefrom.

BACKGROUND ART

Fluoroelastomers, and more specifically perfluoroelastomers, have long been used in a variety of applications that require excellent resistance to high temperature and chemical attack.

To enable crosslinking of these fluoroelastomers, it has been long known to incorporate in the fluoroelastomer polymer chain a small percentage of monomers including nitrile groups, whose reactivity in the presence of a variety of curing agents, including notably aromatic tetra-amines, di(amino(thio)phenols), and organo-tin compounds, including tetraalkyl and tetraaryl compounds, is such to provide crosslinking point of supposedly triazine-type or similar structure, possessing high thermal stability, and certainly higher than stability of bridging/crosslinking groups provided by alternative crosslinking chemistry.

In this field, U.S. Pat. No. 5,545,693 (E.I. DU PONT DE NEMOURS AND COMPANY) Aug. 13, 1996 discloses blends of perfluoroelastomers comprising nitrile groups with nitrile-containing polyperfluoroether, so as to obtain co-cure in the presence of triphenyl tin hydroxide. The addition of the perfluoropolyether is taught as possibly beneficial to the processability and the low temperature properties of the compounds therefrom.

Further, US 2012009438 (3M INNOVATIVE PROPERTIES CO) Jan. 12, 2012 discloses a curable fluoroelastomer composition comprising (i.) a fluoroelastomer comprising functional triazine-forming crosslinking groups, in particular nitrile groups, and (ii.) a second compound comprising repeating units selected from (—$C_4F_8O$—), (—$C_2F_4O$—) or (—$CF_2O$—) or a combination thereof and further containing a reactive group yielding a triazine unit by reaction with the functional group of the fluoroealstomer (e.g. nitriles, amidines, imidoylamines, imidates, amidrazones, amidoximes), in particular a compound of formula $NCCF_2O(CF_2O)_x(C_2F_4O)_yCF_2CN$ wherein x and y are independent from each other integers from 2 to 12. Curable compounds generally further comprise a curing catalyst, which, when the fluoroelastomer and the fluoropolyether compound comprise nitrile groups, comprises amine, amidine, imidate, amidoxime, amidrazone groups. Cured compounds therefrom are described as possessing glass transition temperature of less than −60° C., hence enabling extending their normal use temperature window to very low temperatures.

Generally speaking, nitrile-cure site containing fluoroelastomers have been long recognized for their thermal stability; within this area, dual cure approaches have been already pursued in the past for further improving e.g. curing rate or product performances.

Notably, U.S. Pat. No. 5,447,993 Sep. 5, 1995 discloses nitrile-containing perfluoroelastomers which are cured by a combination of a peroxide, a co-agent, which can be a diene or a triene, and a catalyst causing crosslinks to form using nitrile groups, for achieving faster cure rate, while maintaining good thermal properties in vulcanizates. According to this document, two distinct (chemical) cure processes are believed to take place, one caused by the peroxide and the polyunsaturated co-agent, and the other caused by a catalysed reaction of nitrile groups.

In this area, there remains a continuous quest for curable fluoroelastomer compositions able to deliver upon curing even improved thermal and steam resistance.

SUMMARY OF INVENTION

A first object of the invention is hence a fluoroelastomer composition [composition (C)] comprising:
- at least one fluoroelastomer [fluoroelastomer (A)] comprising from 0.1 to 10.0% moles of recurring units derived from at least one cure-site containing monomer having at least a nitrile group [monomer (CSM)], with respect to total moles of recurring units, and comprising iodine and/or bromine cure sites in an amount such that the I and/or Br content is of from 0.04 to 10.0% wt, with respect to the total weight of fluoroelastomer (A);
- at least an organic peroxide [peroxide (O)];
- at least one polyunsaturated compound [compound (U)];
- at least one nitrile-containing fluoropolyether compound [compound (CN-PFPE)] of formula:

$$T^A\text{-O—}R_f\text{-}T^{A'} \qquad (I)$$

wherein:
- $R_f$ is (per)fluoropolyoxyalkylene chain [chain ($R_f$)] comprising recurring units having at least one catenary ether bond and at least one fluorocarbon moiety;
- $T^A$ and $T^{A'}$, equal to or different from each other, are selected from the group consisting of (hydro)(fluoro) carbon group, optionally comprising ethereal oxygen atom(s), and comprising at least one nitrile group; and
- a nitrile-curing co-agent [agent (A)] comprising at least one —NH— group.

The Applicant has surprisingly found that when using the afore-mentioned dual-cure system, including (j) a nitrile-containing fluoropolyether compound, combined with (jj) a suitable N—H containing co-agent able to promote triazine formation from CN moieties, and (jjj) a polyunsaturated compound, an iodine-containing fluoroelastomer comprising nitrile cure-sites can be cured in a surprisingly advantageous manner, so as to deliver significantly improved steam resistance combined with thermal resistance, specifically substantially improved performances over performances associated to compounds cured by single "nitrile"-curing.

DETAILED DESCRIPTION OF THE INVENTION

As said, the composition (C) comprises at least one nitrile-containing fluoropolyether compound [compound (CN-PFPE)] of formula (I) as above detailed.

The (per)fluoropolyoxyalkylene chain [chain ($R_f$)] of compound (CN-PFPE) is preferably a chain comprising a plurality of recurring units ($R_1$), said recurring units having general formula: —$(CF_2)_k$—CFZ—O—, wherein k is an integer of from 0 to 3 and Z is selected between a fluorine atom and a $C_1$-$C_6$ perfluoro(oxy)alkyl group.

Chain ($R_f$) of the compound (CN-PFPE) more preferably complies with formula:

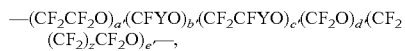
—$(CF_2CF_2O)_{a'}(CFYO)_{b'}(CF_2CFYO)_{c'}(CF_2O)_{d'}(CF_2(CF_2)_zCF_2O)_{e'}$—, wherein the recurring units are statistically distributed along the (per)fluoropolyoxyalkylene chain, wherein:
Y is a $C_1$-$C_5$ perfluoro(oxy)alkyl group;
z is 1 or 2;
a', b', c', d', e' are integers ≥0.

Most preferably, chain ($R_f$) of compound (CN-PFPE) complies with formula:

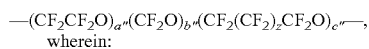
—$(CF_2CF_2O)_{a''}(CF_2O)_{b''}(CF_2(CF_2)_zCF_2O)_{c''}$—,
wherein:

z is 1 or 2;
a", b", c" are integers ≥0.

Chain ($R_f$) is generally selected so as to possess a number averaged molecular weight of 500 to 6000, preferably of 750 to 5000, even more preferably of 1000 to 4500.

Generally, compound (CN-PFPE) complies with formula (II):

$$T^B\text{-O}—R^*_f\text{-}T^{B'} \quad (II)$$

wherein:
$R^*_f$ is a chain ($R_f$), as above detailed;
each of $T^B$ and $T^{B'}$, equal to or different from each other, are selected from the group consisting of groups $T^{CN*}$ of any of formulae —$CFZ^*$—CN, —$CFZ^*CH_2$—CN, and —$CFZ^*$—$CH_2(OCH_2CH_2)_k$—CN, wherein k is ranging from 0 to 10, $Z^*$ is F or $CF_3$.

Compound (CN-PFPE) preferably complies with formula (III):

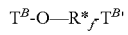
$T^C$-O—$(CF_2CF_2O)_{a'}(CFYO)_{b'}(CF_2CFYO)_{c'}(CF_2O)_{d'}(CF_2(CF_2)_zCF_2O)_{e'}$-$T^{C'}$, wherein:
Y is a $C_1$-$C_5$ perfluoro(oxy)alkyl group;
z is 1 or 2;
a', b', c', d', e' are integers ≥0;
each of $T^C$ and $T^{C'}$, equal to or different from each other, are selected from the group consisting of groups $T^{CN''}$ of any of formulae —$CFZ^*$—CN, —$CFZ^*CH_2$—CN, and $CFZ^*$—$CH_2(OCH_2CH_2)_k$—CN, wherein $Z^*$ is F or $CF_3$; k is ranging from 0 to 10.

Compounds (CN-PFPE) as above detailed, may be provided, as a consequence of their synthetic methods and precursors used, as mixtures of compounds comprising different chemical entities differing because of the nature and length of the (per)fluoropolyoxyalkylene chain, and possibly as mixtures comprising variable fractions of compounds wherein both chain ends are (hydro)(fluoro)carbon groups free from —CN groups, and of compounds wherein one chain end is a (hydro)(fluoro)carbon group free from —CN group and the other chain end is a (hydro)(fluoro)carbon group comprising a —CN group.

With regards to the proportion of so-called "mono" and "di" functional compounds, it is generally understood that best results have been achieved when the compound (CN-PFPE) was provided as a mixture consisting of a majority of compounds of formula (I) [$T^A$-O—$R_f$-$T^{A'}$] as above detailed, wherein both $T^A$ and $T^{A'}$ were groups $T^{CN}$, as above detailed, and a minor amount of compounds of formula (I) [$T^A$-O—$R_f$-$T^{A'}$] as above detailed, but wherein only one of $T^A$ and $T^{A'}$ is a group $T^{CN}$, the other group being free from nitrile groups, and being generally selected from $C_1$-$C_{24}$ (hydro)(fluoro)carbon groups, possibly comprising one or more than one of H, O, and Cl [mono-functional (mCN-PFPE)].

While di-functional compound (CN-PFPE) and mono-functional (mCN-PFPE) may be separated, the compound (CN-PFPE) used in the composition (C) maybe provided under the form of an admixture with corresponding mono-functional (CN-PFPE) compound.

When the compound (CN-PFPE) is provided as an admixture with corresponding mono-functional (CN-PFPE) compound, in the said compounds admixture, the amount of compound (CN-PFPE) and mono-functional compounds (mCN-PFPE) are generally such that the groups $T^{CN}$ are representative of at least 80% mol, preferably at least 85% moles, more preferably at least 90% moles of all end groups of compounds (CN-PFPE) and (mCN-PFPE).

Further, very minor amounts of the side products totally free from —CN groups are not detrimental, and to the sake of economy, may be tolerated in admixture with compound (CN-PFPE). The amount of those "non-functional" compounds, which may be tolerated in admixture with compound (CN-PFPE) and mono-functional compounds (mCN-PFPE) is generally such that the overall amount of end groups free from —CN groups is of less than 10% moles, preferably less than 7% moles, more preferably less than 5% moles, with respect to the total number of end groups of the mixture of compounds (CN-PFPE), mono-functional compounds (mCN-PFPE) and non-functional side products.

Generally, non-functional side products of compound (CN-PFPE) may comply with formula (IV):

$$W\text{—O—}R_f\text{—}W' \quad (IV)$$

wherein:
$R_f$ is a chain $R_f$, as above detailed;
each of W and W', equal to or different from each other, are selected from:
a group of any of formulae —$CF_3$, —$CF_2Cl$, —$CF_2CF_3$, —$CF(CF_3)_2$, —$CF_2H$, —$CFH_2$, —$CF_2CH_3$, —$CF_2CHF_2$, —$CF_2CH_2F$, —$CFZ^*CH_2OH$, —$CFZ^*COOH$, —$CFZ^*COOR_h$ and —$CFZ^*$—$CH_2(OCH_2CH_2)_k$—OH, wherein k is ranging from 0 to 10, wherein $Z^*$ is F or $CF_3$; $R_h$ is a hydrocarbon chain.

Side products more recurrently found may comply with formula (V):

$W^*$—O—$(CF_2CF_2O)_{a'}(CFYO)_{b'}(CF_2CFYO)_{c'}(CF_2O)_{d'}(CF_2(CF_2)_zCF_2O)_{e'}$—$W^{*'}$, wherein:
Y is a $C_1$-$C_5$ perfluoro(oxy)alkyl group;
z is 1 or 2;
a', b', c', d', e' are integers ≥0;
each of $W^*$ and $W^{*'}$, equal to or different from each other, are selected from groups of any of formulae —$CF_3$, —$CF_2Cl$, —$CF_2CF_3$, —$CF(CF_3)_2$, —$CF_2H$, —$CFH_2$, —$CF_2CH_3$, —$CF_2CHF_2$, —$CF_2CH_2F$, —$CFZ^*CH_2OH$, —$CFZ^*COOH$, —$CFZ^*COOR_h$ and —$CFZ^*$—$CH_2(OCH_2CH_2)_k$—OH, wherein k is an integer comprised ranging from 0 to 10, wherein $Z^*$ is F or $CF_3$; $R_h$ is a hydrocarbon chain.

Compounds (CN-PFPE) can be synthesized applying to available PFPE precursors suitable chemistry so as to introduce nitrile groups in chain ends.

Compounds (CN-PFPE) can be notably manufactured by the synthetic methodologies described notably in U.S. Pat. No. 6,984,759 (SOLVAY SOLEXIS SPA) Apr. 8, 2004, in particular in Example 1, in U.S. Pat. No. 3,810,874 (MINNESOTA MINING & MFG) May 14, 1974, in U.S. Pat. No. 4,647,413 (MINNESOTA MINING & MFG) Mar. 3, 1987 and in U.S. Pat. No. 5,545,693 (DU PONT) Aug. 13, 1996.

The amount of the compound (CN-PFPE) ranges normally from 0.1 to 30 weight parts per 100 parts by weight of fluoroelastomer (A), preferably from 0.5 to 15 weight parts per 100 parts by weight of fluoroelastomer (A), more preferably from 1 to 10 weight parts per 100 parts by weight of fluoroelastomer (A).

As mentioned, the composition (C) comprises a nitrile-curing coagent [agent (A)] comprising at least one —NH— group.

Indeed, the Applicant believes, without being bound by this theory, that the nitrile-curing compounds comprising at least one —NH— group are generating at appropriate curing temperature ammonia and/or amines which are positively promoting and catalysing cyclization of nitrile groups to triazine units during the said processes, so as to deliver improved performances.

The nitrile-curing coagent is preferably selected from the group consisting of:
(i) (thio)urea compounds of formula (Ur):

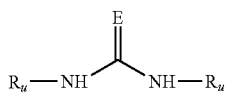

wherein E is O or S, preferably E is O, and each of $R_u$, equal to or different from each other, is independently selected from the group consisting of hydrogen and $C_1$-$C_6$ hydrocarbon groups (in particular $C_1$-$C_6$ alkyl groups);
(ii) cyclic addition products of ammonia or primary amine and aldehyde;
(iii) (thio)carbamates of formula (Ca):

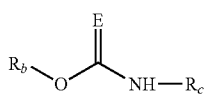

wherein E is oxygen or sulphur; $R_b$ is a $C_1$-$C_{36}$ hydrocarbon group, and $R_c$ is H or a $C_1$-$C_6$ alkyl group.

Among suitable agents (A), (thio)urea compounds, as above detailed, are preferably selected from the group consisting of:
(i-A) (thio)ureas of formula (Ur-2):

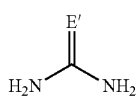

wherein E' is O or S;
cyclic addition products of ammonia or primary amine and aldehyde, as above detailed, are preferably selected from the group consisting of:
(ii-A) cyclic aldehyde adducts trimers of formula (T):

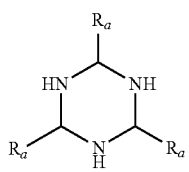

wherein each of $R_a$, equal or different from each other, is selected from the group consisting of hydrogen and $C_1$-$C_6$ hydrocarbon groups (in particular $C_1$-$C_6$ alkyl groups);
(thio)carbamates, as above detailed, are preferably selected from the group consisting of carbamates of formula (Ca-1):

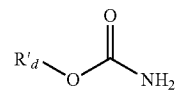

wherein R'd is a $C_1$-$C_{36}$ hydrocarbon group, preferably is a optionally substituted benzyl group.

Agents (A) which have been found particularly useful in the composition of the present invention are the following:

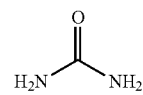

(Ag A-2) Acetaldehyde ammonia trimer of formula:

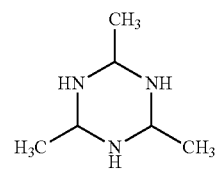

(Ag A-3) Benzyl carbamate of formula:

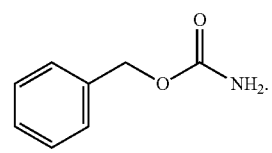 [SMILES: NC(=O)OCc1ccccc1]

The amount of the agent (A) ranges normally from 0.1 to 10 weight parts per 100 parts by weight of fluoroelastomer (A), preferably from 0.1 to 5 weight parts per 100 parts by weight of fluoroelastomer (A), more preferably from 0.1 to 2 weight parts per 100 parts by weight of fluoroelastomer (A).

Use of agents (A) is particularly advantageous over other possible catalysts or co-agents known as promoting the cyclic trimerization of nitrile groups to triazine, as these agents being thermally labile, once delivered their contribution during curing, they will no longer catalyze reversed reactions, possibly leading to degradation phenomena.

As said, the composition (C) comprises at least one polyunsaturated compound or compound (U). The expression "polyunsaturated compound" is hereby intended to designate a compound comprising more than one carbon-carbon unsaturation.

The composition (C) may comprise one or more than one compound (U), as above detailed.

Compounds (U) may be selected from compounds comprising two carbon-carbon unsaturations, compounds comprising three carbon-carbon unsaturations and compounds comprising four or more than four carbon-carbon unsaturations.

Among compounds (U) comprising two carbon-carbon unsaturations, mention can be made of bis-olefins [bis-olefin (OF)] having general formula:

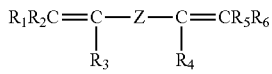

wherein $R_1$, $R_2$, $R_3$, $R_4$, $R_5$ and $R_6$, equal or different from each other, are H or a group —$R_{OF}$ or —$OR_{OF}$, with $R_{OF}$ being $C_1$-$C_5$ alkyl, possibly comprising halogen(s); Z is a linear or branched $C_1$-$C_{18}$ (hydro)carbon radical (including alkylene or cycloalkylene radical), optionally containing oxygen atoms, preferably at least partially fluorinated, or a (per)fluoro(poly)oxyalkylene radical comprising one or more catenary ethereal bonds.

The bis-olefin (OF) is preferably selected from the group consisting of those complying with formulae (OF-1), (OF-2) and (OF-3):
(OF-1)

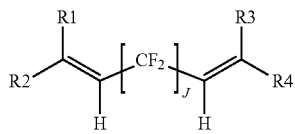

wherein j is an integer between 2 and 10, preferably between 4 and 8, and R1, R2, R3, R4, equal or different from each other, are H, F or $C_{1-5}$ alkyl or (per)fluoroalkyl group; preferably R1, R2 are H and j is 4 or 6; preferred bis-olefins of (OF-1) type are $H_2C=CH-(CF_2)_4-CH=CH_2$ or $H_2C=CH-(CF_2)_6-CH=CH_2$.
(OF-2)

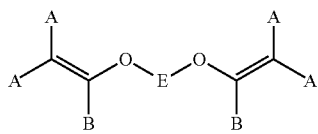

wherein each of A, equal or different from each other and at each occurrence, is independently selected from F, Cl, and H; each of B, equal or different from each other and at each occurrence, is independently selected from F, Cl, H and $OR_B$, wherein $R_B$ is a $C_1$-$C_5$ branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C=CF-O-(CF_2)_5-O-CF=CF_2$.
(OF-3)

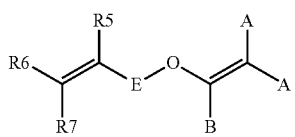

wherein E, A and B have the same meaning as above defined; R5, R6, R7, equal or different from each other, are H, F or $C_{1-5}$ alkyl or $C_{1-5}$ (per)fluoroalkyl group.

Among compounds (U) comprising three carbon-carbon unsaturations, mention can be made of:

tri-substituted cyanurate compounds of general formula:

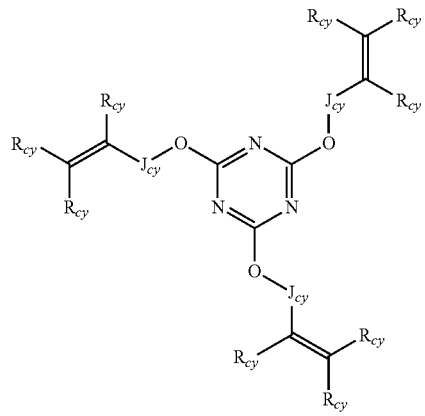

wherein each of $R_{cy}$, equal to or different from each other and at each occurrence, is independently selected from H or a group —$R_{rcy}$ or —$OR_{rcy}$, with $R_{rcy}$ being $C_1$-$C_5$ alkyl, possibly comprising halogen(s), and each of $J_{cy}$, equal to or different from each other and at each occurrence, is independently selected from a bond or a divalent hydrocarbon group, optionally comprising heteroatoms;

tri-substituted cyanurate compounds include notably preferred triallyl cyanurate, trivinyl cyanurate;

tri-substituted isocyanurate compounds of general formula:

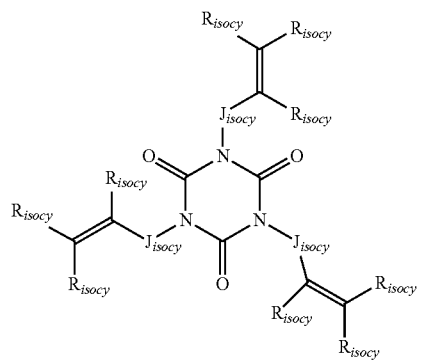

wherein each of $R_{isocy}$, equal to or different from each other and at each occurrence, is independently selected from H or a group —$R_{risocy}$ or —$OR_{risocy}$, with $R_{risocy}$ being $C_1$-$C_5$ alkyl, possibly comprising halogen(s), and each of $J_{isocy}$, equal to or different from each other and at each occurrence, is independently selected from a bond or a divalent hydrocarbon group, optionally comprising heteroatoms; tri-substituted isocyanurate compounds include notably preferred triallyl isocyanurate (otherwise referred to as "TAIC"), trivinyl isocyanurate, with TAIC being the most preferred;

tri-substituted triazine compounds of general formula:

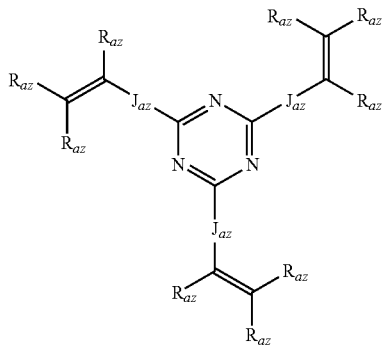

wherein each of $R_{az}$, equal to or different from each other and at each occurrence, is independently selected from H or a group —$R_{raz}$ or —$OR_{raz}$, with $R_{raz}$ being $C_1$-$C_5$ alkyl, possibly comprising halogen(s), and each of $J_{az}$, equal to or different from each other and at each occurrence, is independently selected from a bond or a divalent hydrocarbon group, optionally comprising heteroatoms; tri-substituted triazine compounds include notably compounds disclosed in EP 0860436 A (AUSIMONT SPA) Aug. 26, 1998 and in WO 97/05122 (DU PONT) Feb. 13, 1997;

tri-substituted phosphite compounds of general formula:

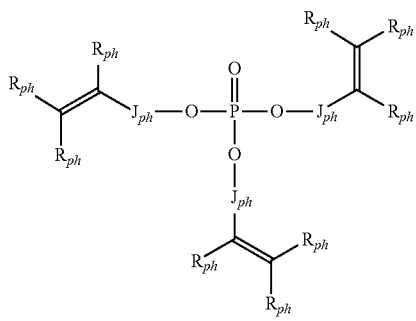

wherein each of $R_{ph}$, equal to or different from each other and at each occurrence, is independently selected from H or a group —$R_{rph}$ or —$OR_{rph}$, with $R_{rph}$ being $C_1$-$C_5$ alkyl, possibly comprising halogen(s), and each of $J_{ph}$, equal to or different from each other and at each occurrence, is independently selected from a bond or a divalent hydrocarbon group, optionally comprising heteroatoms; tri-substituted phosphite compounds include notably preferred tri-allyl phosphite;

tri-substituted alkyltrisiloxanes of general formula:

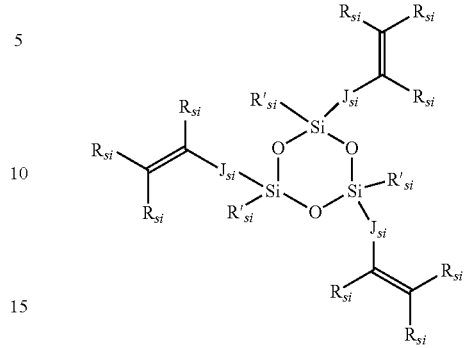

wherein each of $R_{si}$, equal to or different from each other and at each occurrence, is independently selected from H or a group —$R_{rsi}$ or —$OR_{rsi}$, with $R_{rsi}$ being $C_1$-$C_5$ alkyl, possibly comprising halogen(s), each of $R'_{si}$, equal to or different from each other and at each occurrence, is independently selected from $C_1$-$C_5$ alkyl groups, possibly comprising halogen(s), and each of $J_{si}$, equal to or different from each other and at each occurrence, is independently selected from a bond or a divalent hydrocarbon group, optionally comprising heteroatoms; tri-substituted alkyltrisiloxanes compounds include notably preferred 2,4,6-trivinyl methyltrisiloxane and 2,4,6-trivinyl ethyltrisiloxane;

N,N-disubstituted acrylamide compounds of general formula:

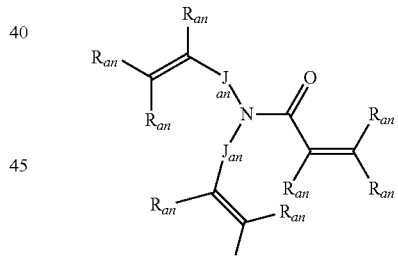

wherein each of $R_{an}$, equal to or different from each other and at each occurrence, is independently selected from H or a group —$R_{ran}$ or —$OR_{ran}$, with $R_{ran}$ being $C_1$-$C_5$ alkyl, possibly comprising halogen(s), and each of $J_{an}$, equal to or different from each other and at each occurrence, is independently selected from a bond or a divalent hydrocarbon group, optionally comprising heteroatoms; N,N-disubstituted acrylamide compounds include notably preferred N,N-diallylacrylamide.

Among compounds (U) comprising four or more carbon-carbon unsaturations, mention can be made of tris(diallylamine)-s-triazine of formula,

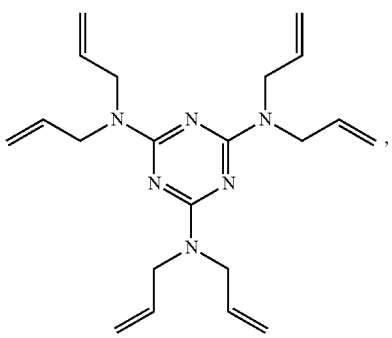 [SMILES: C=CCN(CC=C)c1nc(N(CC=C)CC=C)nc(N(CC=C)CC=C)n1]

hexa-allylphosphoramide, N,N,N',N'-tetra-allyl terephthalamide, N,N,N',N'-tetra-allyl malonamide.

It is generally preferred for the compound (U) to be selected from the group consisting of (i) olefins (OF), as above detailed, in particular olefins of (OF-1) type; and (ii) tri-substituted isocyanurate compounds, as above detailed, in particular TAIC.

The amount of the compound (U) ranges normally from 0.1 to 10 weight parts per 100 parts by weight of fluoroelastomer (A), preferably from 0.1 to 5 weight parts per 100 parts by weight of fluoroelastomer (A), more preferably from 0.1 to 2 weight parts per 100 parts by weight of fluoroelastomer (A).

For the purposes of this invention, the term "(per)fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Generally fluoroelastomer (A) comprises recurring units derived from at least one (per)fluorinated monomer, in addition to recurring units derived from monomer (CSM), as above detailed, wherein said (per)fluorinated monomer is generally selected from the group consisting of:

$C_2$-$C_8$ perfluoroolefins, such as tetrafluoroethylene (TFE), and hexafluoropropene (HFP);

$C_2$-$C_8$ hydrogen-containing fluoroolefins, such as vinyl fluoride; 1,2-difluoroethylene, vinylidene fluoride (VDF), trifluoroethylene (TrFE), pentafluoropropylene, and hexafluoroisobutylene;

(per)fluoroalkylethylenes complying with formula $CH_2$=CH—$R_{f0}$, in which $R_{f0}$ is a $C_1$-$C_6$ (per)fluoroalkyl or a $C_1$-$C_6$ (per)fluorooxyalkyl having one or more ether groups;

chloro- and/or bromo- and/or iodo-$C_2$-$C_6$ fluoroolefins, like chlorotrifluoroethylene (CTFE);

fluoroalkylvinylethers complying with formula $CF_2$=$CFOR_{f1}$ in which $R_{f1}$ is a $C_1$-$C_6$ fluoro- or perfluoroalkyl, e.g. —$CF_3$, —$C_2F_5$, —$C_3F_7$;

hydrofluoroalkylvinylethers complying with formula $CH_2$=$CFOR_{f1}$ in which $R_{f1}$ is a $C_1$-$C_6$ fluoro- or perfluoroalkyl, e.g. —$CF_3$, —$C_2F_5$, —$C_3F_7$;

fluoro-oxyalkylvinylethers complying with formula $CF_2$=$CFOX_0$, in which $X_0$ is a $C_1$-$C_{12}$ oxyalkyl, or a $C_1$-$C_{12}$ (per)fluorooxyalkyl having one or more ether groups; in particular (per)fluoro-methoxy-vinylethers complying with formula $CF_2$=$CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;

functional fluoro-alkylvinylethers complying with formula $CF_2$=$CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

(per)fluorodioxoles, of formula:

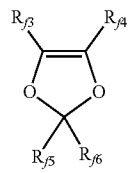

wherein each of $R_{f3}$, $R_{f4}$, $R_{f5}$, $R_{f6}$, equal to or different from each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Examples of hydrogenated monomers are notably hydrogenated alpha-olefins, including ethylene, propylene, 1-butene, diene monomers, styrene monomers, alpha-olefins being typically used.

Fluoroelastomers (A) are in general amorphous products or products having a low degree of crystallinity (crystalline phase less than 20% by volume) and a glass transition temperature ($T_g$) below room temperature. In most cases, the fluoroelastomer (A) has advantageously a $T_g$ below 10° C., preferably below 5° C., more preferably 0° C.

The fluoroelastomer (A) is preferably selected among:

(1) VDF-based copolymers, in which VDF is copolymerized with monomer (CSM), as above detailed, and at least one additional comonomer selected from the group consisting of:

(a) $C_2$-$C_8$ perfluoroolefins, such as tetrafluoroethylene (TFE), hexafluoropropylene (HFP);

(b) hydrogen-containing $C_2$-$C_8$ olefins, such as vinyl fluoride (VF), trifluoroethylene (TrFE), hexafluoroisobutene (HFIB), perfluoroalkyl ethylenes of formula $CH_2$=CH—$R_f$, wherein $R_f$ is a $C_1$-$C_6$ perfluoroalkyl group;

(c) $C_2$-$C_8$ fluoroolefins comprising at least one of iodine, chlorine and bromine, such as chlorotrifluoroethylene (CTFE);

(d) (per)fluoroalkylvinylethers (PAVE) of formula $CF_2$=$CFOR_f$, wherein $R_f$ is a $C_1$-$C_6$ (per)fluoroalkyl group, preferably $CF_3$, $C_2F_5$, $C_3F_7$; (e) (per)fluoro-oxy-alkylvinylethers of formula $CF_2$=CFOX, wherein X is a $C_1$-$C_{12}$ ((per)fluoro)-oxyalkyl comprising catenary oxygen atoms, e.g. the perfluoro-2-propoxypropyl group;

(f) (per)fluorodioxoles having formula:

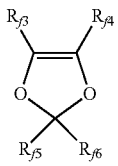

wherein each of $R_{f3}$, $R_{f4}$, $R_{f5}$, $R_{f6}$, equal to or different from each other, is independently selected from the group consisting of fluorine atom and $C_1$-$C_6$ (per)fluoroalkyl groups, optionally comprising one or more than one oxygen atom, such as notably —$CF_3$, —$C_2F_5$, —$C_3F_7$, —$OCF_3$, —$OCF_2CF_2OCF_3$; preferably, perfluorodioxoles;

(g) (per)fluoro-methoxy-vinylethers (MOVE, hereinafter) having formula:

$$CF_2=CFOCF_2OR_{f2}$$

wherein $R_{f2}$ is selected from the group consisting of $C_1$-$C_6$ (per)fluoroalkyls; $C_5$-$C_6$ cyclic (per)fluoroalkyls; and $C_2$-$C_6$ (per)fluorooxyalkyls, comprising at least one catenary oxygen atom; $R_{f2}$ is preferably —$CF_2CF_3$ (MOVE1); —$CF_2CF_2OCF_3$ (MOVE2); or —$CF_3$ (MOVE3);

(h) $C_2$-$C_8$ non-fluorinated olefins (OI), for example ethylene and propylene; and (2) TFE-based copolymers, in which TFE is copolymerized with monomer (CSM), as above detailed, and at least one additional comonomer selected from the group consisting of (c), (d), (e), (g), (h) and (i) as above detailed.

Fluoroelastomer (A) is generally selected among TFE-based copolymers, as above detailed.

Optionally, fluoroelastomer (A) of the present invention may also comprises recurring units derived from a bis-olefin [bis-olefin (OF)], as above detailed.

Among cure-site containing monomers of type (CSM), as above detailed, comprised in fluoroelastomer (A), preferred monomers are (per)fluorinated and are especially those selected from the group consisting of:

(CSM-1) perfluorovinyl ethers containing nitrile groups of formula $CF_2=CF—(OCF_2CFX^{CN})_m—O—(CF_2)_n—CN$, with $X^{CN}$ being F or $CF_3$, m being 0, 1, 2, 3 or 4; n being an integer from 1 to 12;

(CSM-2) perfluorovinyl ethers containing nitrile groups of formula $CF_2=CF—(OCF_2CFX^{CN})_{m'}—O—CF_2—CF(CF_3)—CN$, with $X^{CN}$ being F or $CF_3$, m' being 0, 1, 2, 3 or 4.

Specific examples of cure-site containing monomers of type CSM-1 and CSM-2 suitable to the purposes of the present invention are notably those described in U.S. Pat. No. 4,281,092 (DU PONT) Jul. 28, 1981, U.S. Pat. No. 4,281,092 (DU PONT) Jul. 28, 1981, U.S. Pat. No. 5,447,993 (DU PONT) Sep. 5, 1995 and U.S. Pat. No. 5,789,489 (DU PONT) Aug. 4, 1998.

Preferred cure-site monomer is perfluoro(8-cyano-5-methyl-3,6-dioxa-1-octene) of formula: $CF_2=CF—O—CF_2—CF(CF_3)—O—CF_2—CF_2—CN$ (8-CNVE).

As said, fluoroelastomer (A) comprises iodine and/or bromine cure sites.

These iodine and/or bromine cure sites might be comprised as pending groups bound to the backbone of the fluoroelastomer (A) polymer chain or might be comprised as terminal groups of said polymer chain.

According to a first embodiment, the iodine and/or bromine cure sites are comprised as pending groups bound to the backbone of the fluoroelastomer (A) polymer chain; the fluoroelastomer (A) according to this embodiment typically comprises recurring units derived from brominated and/or iodinated cure-site comonomers selected from:

bromo and/or iodo alpha-olefins containing from 2 to 10 carbon atoms such as bromotrifluoroethylene or bromotetrafluorobutene described, for example, in U.S. Pat. No. 4,035,565 (DU PONT) Jul. 12, 1977 or other compounds bromo and/or iodo alpha-olefins disclosed in U.S. Pat. No. 4,694,045 (DU PONT) Sep. 15, 1987;

iodo and/or bromo fluoroalkyl vinyl ethers (as notably described in U.S. Pat. No. 4,564,662 (MINNESOTA MINING & MFG [US]) Jan. 14, 1986 and EP 199138 A (DAIKIN IND LTD) Oct. 29, 1986).

According to a second preferred embodiment, the iodine and/or bromine cure sites (preferably iodine cure sites) are comprised as terminal groups of the fluoroelastomer (A) polymer chain; the fluoroelastomer according to this embodiment is generally obtained by addition to the polymerization medium during fluoroelastomer (A) manufacture of at least one of:

iodinated and/or brominated chain-transfer agent(s); suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \le x+y \le 2$ (see, for example, U.S. Pat. No. 4,243,770 (DAIKIN IND LTD) Jan. 6, 1981 and U.S. Pat. No. 4,943,622 (NIPPON MEKTRON KK) Jul. 24, 1990); and alkali metal or alkaline-earth metal iodides and/or bromides, such as described notably in U.S. Pat. No. 5,173,553 (AUSIMONT SRL) Dec. 22, 1992.

Advantageously, for ensuring acceptable reactivity it is generally understood that the content of iodine and/or bromine in the fluoroelastomer (A) should be of at least 0.05% wt, preferably of at least 0.06% weight, with respect to the total weight of fluoroelastomer (A).

On the other side, amounts of iodine and/or bromine not exceeding preferably 7% wt, more specifically not exceeding 5% wt, or even not exceeding 4% wt, with respect to the total weight of fluoroelastomer (A), are those generally selected for avoiding side reactions and/or detrimental effects on thermal stability.

Exemplary fluoroelastomers (A) which can be used in the composition of the present invention are those having iodine cure sites comprised as terminal groups and having following monomers composition (in mol %, with respect to the total moles of recurring units):

(i) tetrafluoroethylene (TFE): 50-80%; (per)fluoroalkylvinylethers (PAVE): 15-50%; monomer (CSM): 0.1-10%; bis-olefin (OF): 0-5%;

(ii) tetrafluoroethylene (TFE): 20-70%; (per)fluoromethoxy-vinylethers (MOVE): 25-75%; (per)fluoroalkylvinylethers (PAVE): 0-50%; monomer (CSM) 0.1-10%; bis-olefin (OF): 0-5%.

The composition (C) further comprises at least an organic peroxide [peroxide (O)]; the choice of the said peroxide (O) is not particularly critical provided that the same is capable of generating radicals by thermal decomposition. Among most commonly used peroxides, mention can be made of di(alkyl/alryl) peroxides, including for instance di-tert-butyl peroxide, 2,5-dimethyl-2,5-bis(tert-butylperoxy)hexane, di(t-butylperoxyisopropyl)benzene, dicumyl peroxide; diacyl peroxides, including dibenzoyl peroxide, disuccinic acid peroxide, di(4-methylbenzoyl)peroxide, di(2,4-dichlorobenzoyl)peroxide, dilauroyl peroxide, decanoyl peroxide; percarboxylic acids and esters, including di-tert-butyl perbenzoate, t-butylperoxy-2-ethylhexanoate, 1,1,3,3-tetramethylethylbutyl peroxy-2-ethylhexanoate, 2,5-dimethyl-2,5-di(2-ethylhexanoylperoxy)hexane; peroxycarbonates including notably di(4-t-butylcyclohexyl) peroxydicarbonate, di(2-phenoxyethyl)peroxydicarbonate, bis[1,3-dimethyl-3-(tert-butylperoxy)butyl] carbonate, t-hexylperoxyisoproprylcarbonate, and t-butylperoxyisopropylcarbonate. Other suitable peroxide systems are those described, notably, in patent applications EP 136596 A (MONTEDISON SPA) Apr. 10, 1985 and EP 410351 A (AUSIMONT SRL) Jan. 30, 1991, whose content is hereby incorporated by reference.

Choice of the most appropriate peroxide depending upon curing conditions (time, temperature) will be done by one of ordinary skills in the art considering notably ten-hours half time temperature of the peroxide (O).

The amount of peroxide (O) in the composition (C) is generally of 0.1 to 5 phr, preferably of 0.2 to 4 phr, relative to 100 weight parts of fluoroelastomer (A).

The composition (C) may further additionally comprise ingredients which maybe commonly used for the peroxide curing of fluoroelastomers; more specifically, composition (C) may generally further comprise
(a) one or more than one metallic basic compound, in amounts generally of from 0.5 to 15 phr, and preferably of from 1 to 10 phr, relative to 100 weight parts of fluoroelastomer (A); metallic basic compounds are generally selected from the group consisting of (j) oxides or hydroxides of divalent metals, for instance oxides or hydroxides of Mg, Zn, Ca or Pb, and (jj) metal salts of a weak acid, for instance Ba, Na, K, Pb, Ca stearates, benzoates, carbonates, oxalates or phosphites;
(b) one or more than one acid acceptor which is not a metallic basic compound, in amounts generally of from 0.5 to 15 phr, and preferably of from 1 to 10 phr, relative to 100 weight parts of fluoroelastomer (A); these acid acceptors are generally selected from nitrogen-containing organic compounds, such as 1,8-bis(dimethylamino)naphthalene, octadecylamine, etc., as notably described in EP 708797 A (DU PONT) May 1, 1996;
(c) other conventional additives, such as fillers, thickeners, pigmen-ts, antioxidants, stabilizers, processing aids, and the like.

The invention also pertains to a method for fabricating shaped articles comprising curing the composition (C), as above described.

The composition (C) can be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, fluoroelastomeric uncured composition into a finished article made of non-tacky, strong, insoluble, chemically and thermally resistant cured fluoroelastomer material.

Yet, the invention pertains to cured articles obtained from the composition (C), as above detailed. Said cured articles are generally obtained by moulding and curing the fluoroelastomer composition, as above detailed.

These cured articles may be sealing articles, including O(square)-rings, packings, gaskets, diaphragms, shaft seals, valve stem seals, piston rings, crankshaft seals, cam shaft seals, and oil seals or maybe piping and tubings, in particular flexible hoses or other items, including conduits for delivery of hydrocarbon fluids and fuels.

Cured articles obtained from the composition (C), thanks to their outstanding thermal and water vapour resistance, are suitable for being used in fields of endeavours wherein extremely demanding conditions of use are combined with exposure to water vapour, e.g. for use in the oil and gas market as seals, components and sealing elements, gaskets, hoses, tubings.

Further in addition, the invention pertains to a method for processing the composition (C), as above detailed, according any of injection moulding, compression moulding, extrusion moulding, coating, screen printing technique, form-in-place technique.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

EXAMPLES

Manufacture of Nitrile-Containing Fluoroelastomer

Example 1

In a 5 litres reactor equipped with a mechanical stirrer operating at 630 rpm, 3.1 l of demineralized water and 31 ml of a microemulsion, previously obtained by mixing 7.4 ml of a perfluoropolyoxyalkylene having acidic end groups of formula: $CF_2ClO(CF_2—CF(CF_3)O)_n(CF_2O)_mCF_2COOH$, wherein n/m=10, having average molecular weight of 600, 1.9 ml of a 30% v/v NH4OH aqueous solution, 17.4 ml of demineralised water and 4.3 ml of GALDEN® D02 perfluoropolyether of formula: $C—F-3-O(CF_2CF(CF_3)O)_n(CF_2O)_mCF_3$ with n/m=20, having average molecular weight of 450, were introduced.

Then 2.5 g of 1,4-diiodoperfluorobutane ($C_4F_8I_2$) as chain transfer agent were introduced, and the reactor was heated and maintained at a set-point temperature of 80° C.; a mixture of tetrafluoroethylene (TFE) (38% moles) and perfluoromethylvinylether (MVE) (62% moles) was then added to reach a final pressure of 21 bar (2.1 MPa). 0.31 g of ammonium persulfate (APS) as initiator were then introduced. Pressure was maintained at set-point of 21 bar by continuous feeding of a gaseous mixture of TFE (60% moles) and MVE (40% moles) up to a total of 1350 g, and 129 g of 8-CNVE in 20 portions each 5% increase in conversion, starting from the beginning of the polymerization, were fed to the reactor. Moreover, 0.16 g of APS at 15%, 40% and 55% conversion of gaseous mixture, were introduced. Then the reactor was cooled, vented and the latex recovered. The latex was coagulated with nitric acid as a coagulation agent, and the polymer separated from the aqueous phase, washed with demineralised water and dried in a convection oven at 120° C. for 24 hours.

The composition of the obtained polymer from NMR analysis was found to be: TFE 64.6% mol, MVE 34.2% mol, 8-CNVE 1.2% mol, and the Mooney viscosity at 121° C. is 64 MU.

General Compounding and Curing Procedure

The fluoroelastomer of Ex. 1 was compounded with the ingredients as detailed below in a two rolls open mill. Plaques were cured in a pressed mould and then post-treated in an air circulating oven in conditions detailed in Table below.

Cure behaviour was characterized by Moving Die Rheometer (MDR), in conditions as specified below, by determining the following properties:

$M_L$=Minimum torque (lb×in)

$M_H$=Maximum torque (lb×in)

$t_{S2}$=Scorch time, time for two units rise from $M_L$ (sec);

$t_{50}$=Time to 50% state of cure (sec);

$t_{90}$=Time to 90% state of cure (sec).

The tensile properties have been determined on specimens punched out from the plaques, according to the ASTM D 412 C Standard, after post-cure and after exposure to overheated water vapour at 220° C. or 250° C.

TS is the tensile strength in MPa;

$M_{100}$ is the modulus in MPa at an elongation of 100%;

E.B. is the elongation at break in %.

Variation of properties (including weight change, volume swell and mechanical properties) upon exposure to steam are recollected as percentage over the corresponding values of the properties as determined on cured sample after post-cure. The value "specimens destroyed" ("D" in table 3, herein below) means specimen was destroyed upon exposure, so that no meaningful determination was possible.

Compression set (CS) values have been determined on O-rings (#214 class) according to the ASTM D 395-B method at temperatures ranging from 200° C. to 300° C.; values in the table are the average of determinations made on 4 specimens. The value "specimens destroyed" ("D" in table 3, herein below) means that all specimens were destroyed upon compression in indicated conditions, so that no measurement of % deformation was possible.

Curing recipe and conditions and properties of cured sample, before and after exposure to water vapour at 220° C. or 250° C. are summarized, respectively, in tables 1 to 3.

TABLE 1

| Ingredient | | Ex. 1C | Ex. 2 | Ex. 3 |
|---|---|---|---|---|
| FKM from Ex. 1 | Wt parts | 100.00 | 100.00 | 100.00 |
| CN-PFPE(*) | phr | 10.00 | 5.00 | 5.00 |
| Bis-Olefin(#) | phr | | 0.70 | |
| Peroxide($) | phr | | 0.50 | 0.50 |
| C-black(°) | phr | 20.00 | 20.00 | 20.00 |
| Urea(−) | | 0.25 | 0.25 | 0.25 |
| TAIC(§) | phr | | | 0.70 |

(*)CN-PFPE is a compound of formula CN—CF$_2$O(CF$_2$CF$_2$O)m(CF$_2$O)$_p$CF$_2$CN wherein p/m = 0.6 and p, m are such that the number average molecular weight of the nitrile is about 1520, comprising a minor amount of mono-functional and non-functional corresponding derivatives;
(#)Bis-Olefin: of formula CH$_2$=CH—(CF$_2$)$_6$—CH=CH$_2$;
($)Peroxide: neat 2,5-dimethyl-2,5-di-t-butyl-peroxy-hexane, commercially available from Arkema under tradename Luperox® 101;
(°)neat urea (purity: 99.0%), commercially available from Sigma-Aldrich;
(§)TAIC: Triallyl isocyanurate (75%) dispersion in silica, commercially available as Drimix® TAIC 75 from Finco.

TABLE 2

| Sample | | Ex. 1C | Ex. 2 | Ex. 3 |
|---|---|---|---|---|
| $M_L$ | (lb × in) | 0.3 | 0.1 | 0.2 |
| $M_H$ | (lb × in) | 12.1 | 15.7 | 22.1 |
| $t_{s2}$ | (s) | 173.0 | 61.0 | 29.0 |
| $t_{50}$ | (s) | 383.0 | 164.0 | 75.0 |
| $t_{90}$ | (s) | 1092.0 | 921.0 | 613.0 |
| Molding conditions at 170° C. | | 16 min | 15 min | 10 min |
| Post cure in air | | (8 + 16) h @290° C. | | |

TABLE 3

| Property | | Ex. 1C | Ex. 2 | Ex. 3 |
|---|---|---|---|---|
| After post-cure | | | | |
| TS | (MPa) | 9.3 | 10.7 | 11.7 |
| $M_{100}$ | (MPa) | 5.2 | 6.2 | 7.9 |
| E.B. | (%) | 133 | 127 | 124 |
| CS (70 h at 200° C.) | (%) | 16 | 12 | 19 |
| CS (70 h at 300° C.) | (%) | 25 | 24 | 27 |
| Steam resistance 220° C./168 hours | | | | |
| ΔTS | (%) | D | −20 | −53 |
| Δ$M_{100}$ | (%) | D | −39 | −74 |
| ΔE.B. | (%) | D | 50 | 100 |
| Δweight | (%) | D | 0.3 | 0.3 |
| Δvolume | (%) | D | 0.7 | 0.7 |
| Steam resistance 250° C./168 hours | | | | |
| ΔTS | (%) | D | −40 | −69 |
| Δ$M_{100}$ | (%) | D | −51 | −80 |
| ΔE.B. | (%) | D | 55 | 142 |
| Δweight | (%) | D | 0.3 | 0.3 |
| Δweight | (%) | D | 0.7 | 0.7 |

The invention claimed is:

1. A fluoroelastomer composition (C) comprising:
   at least one fluoroelastomer (A) comprising from 0.1 to 10.0% moles of recurring units derived from at least one monomer (CSM), wherein monomer (CSM) is at least one cure-site containing monomer having at least a nitrile group, with respect to total moles of recurring units, and comprising iodine and/or bromine cure sites in an amount such that the I and/or Br content is of from 0.04 to 10.0% wt, with respect to the total weight of fluoroelastomer (A);
   at least an organic peroxide (O);
   at least one polyunsaturated compound (U);
   at least one nitrile-containing fluoropolyether compound (CN-PFPE) of formula:

$$T^A\text{-O}—R_f\text{-}T^{A'} \quad (I)$$

wherein:
   $R_f$ is (per)fluoropolyoxyalkylene chain ($R_f$) comprising recurring units having at least one catenary ether bond and at least one fluorocarbon moiety;
   $T^A$ and $T^{A'}$, equal to or different from each other, are selected from the group consisting of (hydro)(fluoro) carbon groups, optionally comprising ethereal oxygen atom(s), and comprising at least a nitrile group; and
   agent (A), wherein agent (A) is a nitrile-curing co-agent comprising at least one —NH— group.

2. The composition (C) according to claim 1, wherein compound (CN-PFPE) complies with formula (II):

$$T^B\text{-O}—R^*_f\text{-}T^{B'} \quad (II)$$

wherein:
   $R^*_f$ is a chain ($R_f$);
   each of $T^B$ and $T^{B'}$, equal to or different from each other, are selected from the group consisting of groups $T^{CN*}$ of any formulae —CF$_2$—CN, —CFZ*CH$_2$—CN, and —CFZ*—CH$_2$(OCH$_2$CH$_2$)$_k$—CN, wherein k is a number ranging from 0 to 10, and Z* is F or CF$_3$.

3. The composition (C) according to claim 1, wherein agent (A) is selected from the group consisting of:

(i) (thio)urea compounds of formula (Ur):

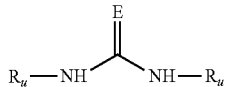

wherein E is O or S and each of $R_u$, equal to or different from each other, is independently selected from the group consisting of hydrogen and $C_1$-$C_6$ hydrocarbon groups;

(ii) cyclic addition products of ammonia or primary amine and aldehyde; and (iii) (thio)carbamates of formula (Ca):

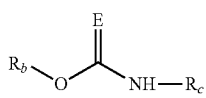

wherein E is oxygen or sulphur; $R_b$ is a $C_1$-$C_{36}$ hydrocarbon group, and $R_c$ is H or a $C_1$-$C_6$ alkyl group.

4. The composition (C) according to claim 1, wherein the at least one polyunsaturated compound (U) is selected from compounds comprising two carbon-carbon unsaturations, compounds comprising three carbon-carbon unsaturations and compounds comprising four or more than four carbon-carbon unsaturations, and wherein:

(j) compounds (U) comprising two carbon-carbon unsaturations are selected from the group consisting of bis-olefins (OF) having general formula:

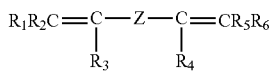

wherein $R_1$, $R_2$, $R_3$, $R_4$, $R_5$ and $R_6$, equal or different from each other, are H, —$R_{OF}$ or —$OR_{OF}$, with $R_{OF}$ being $C_1$-$C_5$ alkyl, optionally comprising one or more halogens; Z is a linear or branched $C_1$-$C_{18}$ (hydro)carbon radical, optionally containing oxygen atoms, and optionally at least partially fluorinated, or a (per)fluoro(poly)oxyalkylene radical comprising one or more catenary ethereal bonds, (jj) compounds (U) comprising three carbon-carbon unsaturations are selected from the group consisting of:

tri-substituted cyanurate compounds of general formula:

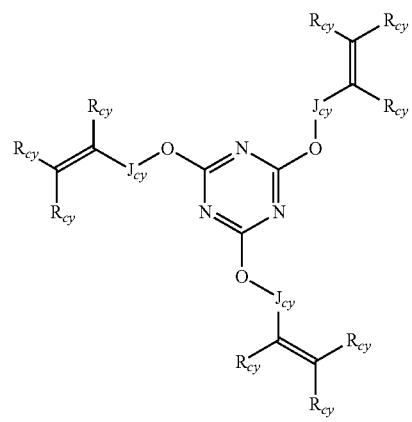

wherein each of $R_{cy}$, equal to or different from each other and at each occurrence, is independently selected from H, —$R_{rcy}$ or —$OR_{rcy}$, with $R_{rcy}$ being $C_1$-$C_5$ alkyl, optionally comprising one or more halogens and each of $J_{cy}$, equal to or different from each other and at each occurrence, is independently selected from a bond or a divalent hydrocarbon group, optionally comprising one or more heteroatoms;

tri-substituted isocyanurate compounds of general formula:

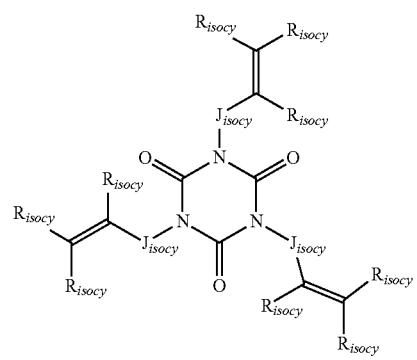

wherein each of $R_{isocy}$, equal to or different from each other and at each occurrence, is independently selected from or a group H, $R_{risocy}$ or —$OR_{risocy}$, with $R_{risocy}$ being $C_1$-$C_5$ alkyl, optionally comprising one or more halogens, and each of $J_{isocy}$, equal to or different from each other and at each occurrence, is independently selected from a bond or a divalent hydrocarbon group, optionally comprising one or more heteroatoms;

tri-substituted triazine compounds of general formula:

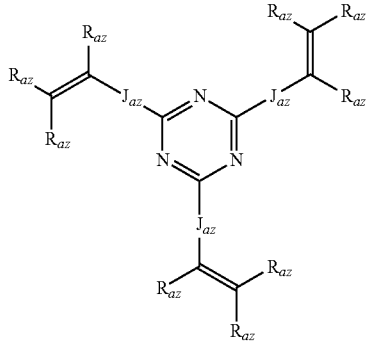

wherein each of $R_{az}$, equal to or different from each other and at each occurrence, is independently selected from H, —$R_{raz}$ or —$OR_{raz}$, with $R_{raz}$ being $C_1$-$C_5$ alkyl, optionally comprising one or more halogens, and each of $J_{az}$, equal to or different from each other and at each occurrence, is independently selected from a bond or a divalent hydrocarbon group, optionally comprising one or more heteroatoms;

tri-substituted phosphite compounds of general formula:

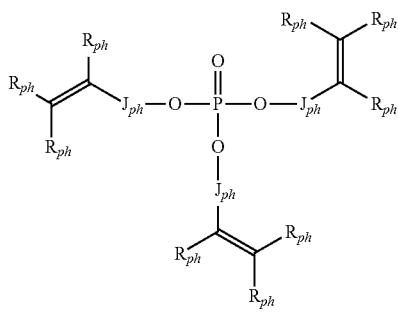

wherein each of $R_{ph}$, equal to or different from each other and at each occurrence, is independently selected from H, —$R_{rph}$ or —$OR_{rph}$, with $R_{rph}$ being $C_1$-$C_5$ alkyl, optionally comprising one or more halogens, and each of $J_{ph}$, equal to or different from each other and at each occurrence, is independently selected from a bond or a divalent hydrocarbon group, optionally comprising one or more heteroatoms;

tri-substituted alkyltrisiloxanes of general formula:

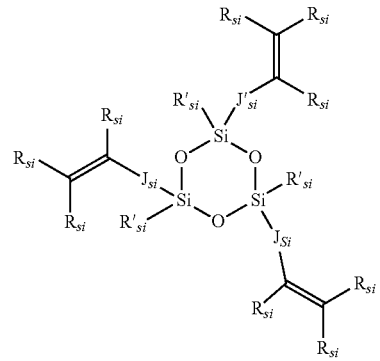

wherein each of $R_{si}$, equal to or different from each other and at each occurrence, is independently selected from H, —$R_{rsi}$ or —$OR_{rsi}$, with $R_{rsi}$ being $C_1$-$C_5$ alkyl, optionally comprising one or more halogens, each of $R'_{si}$, equal to or different from each other and at each occurrence, is independently selected from $C_1$-$C_5$ alkyl groups, optionally comprising one or more halogens and each of $J_{si}$, equal to or different from each other and at each occurrence, is independently selected from a bond or a divalent hydrocarbon group, optionally comprising one or more heteroatoms; and N,N-disubstituted acrylamide compounds of general formula:

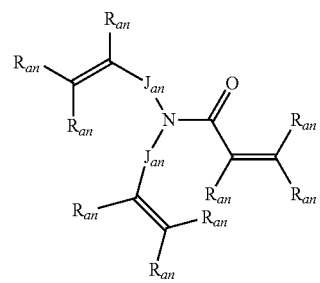

wherein each of $R_{an}$, equal to or different from each other and at each occurrence, is independently selected from H, —$R_{ran}$ or —$OR_{ran}$, with $R_{ran}$ being $C_1$-$C_5$ alkyl, optionally comprising one or more halogens, and each of $J_{an}$, equal to or different from each other and at each occurrence, is independently selected from a bond or a divalent hydrocarbon group, optionally comprising one or more heteroatoms; and (jjj) wherein compounds (U) comprising four or more carbon-carbon unsaturations are selected from the group consisting of tris(diallylamine)-s-triazine of formula:

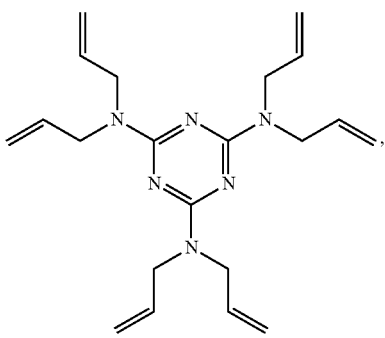 [SMILES: C=CCN(CC=C)c1nc(N(CC=C)CC=C)nc(N(CC=C)CC=C)n1]

hexa-allylphosphoramide, N,N,N',N'-tetra-allyl terephthalamide, and N,N,N',N'-tetra-allyl malonamide.

5. The composition (C) of claim 4, wherein the compound (U) is selected from the group consisting of
(i) olefins (OF) selected from the group consisting of those complying with formulae (OF-1), (OF-2) and (OF-3):
(OF-1)

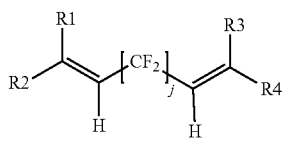

wherein j is an integer between 2 and 10 and R1, R2, R3, R4, equal or different from each other, are H, F or $C_{1-5}$ alkyl or (per)fluoroalkyl group;
(OF-2)

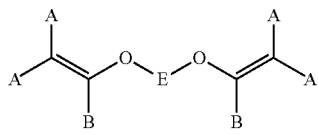

wherein each of A, equal or different from each other and at each occurrence, is independently selected from F, Cl, and H; each of B, equal or different from each other and at each occurrence, is independently selected from F, Cl, H and $OR_B$, wherein $R_B$ is a $C_1$-$C_5$ branched or straight chain alkyl radical which can be partially, substantially or completely fluorinated or chlorinated; E is a divalent group having 2 to 10 carbon atoms, optionally fluorinated, which may be inserted with ether linkages;
(OF-3)

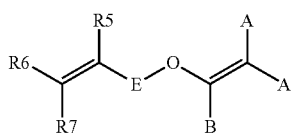

wherein E, A and B have the same meaning as above defined; R5, R6, R7, equal or different from each other, are H, F or $C_{1-5}$ alkyl or $C_{1-5}$ (per)fluoroalkyl group; and
(ii) tri-substituted isocyanurate compounds.

6. The composition of claim 1, wherein fluoroelastomer (A) comprises recurring units derived from at least one (per)fluorinated monomer, in addition to recurring units derived from the at least one monomer (CSM), wherein said (per)fluorinated monomer is selected from the group consisting of:

$C_2$-$C_8$ perfluoroolefins;

$C_2$-$C_8$ hydrogen-containing fluoroolefins;

(per)fluoroalkylethylenes complying with formula $CH_2=CH-R_{f0}$, in which $R_{f0}$ is a $C_1$-$C_6$ (per)fluoroalkyl or a $C_1$-$C_6$ (per)fluorooxyalkyl having one or more ether groups;

chloro- and/or bromo- and/or iodo-$C_2$-$C_6$ fluoroolefins;

fluoroalkylvinylethers complying with formula $CF_2=CFOR_{f1}$ in which $R_{f1}$ is a $C_1$-$C_6$ fluoro- or perfluoroalkyl;

hydrofluoroalkylvinylethers complying with formula $CH_2=CFOR_{f1}$ in which $R_{f1}$ is a $C_1$-$C_6$ fluoro- or perfluoroalkyl, e.g. $CF_4$, fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups;

functional fluoro-alkylvinylethers complying with formula $CF_2=CFOY_0$, in which $Y_0$ is a $C_1$-$C_{12}$ alkyl or (per)fluoroalkyl, a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

(per)fluorodioxoles, of formula

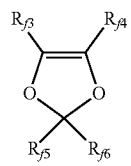

wherein each of $R_{f3}$, $R_{f4}$, $R_{f5}$, $R_{f6}$, equal to or different from each other, is independently a fluorine atom, a $C_1$-$C_6$ fluoro- or per(halo)fluoroalkyl, optionally comprising one or more oxygen atom.

7. The composition (C) of claim 6, wherein the fluoroelastomer (A) is selected from the group consisting of:
(1) VDF-based copolymers, in which VDF is copolymerized with the at least one monomer (CSM) and at least one additional comonomer selected from the group consisting of:
(a) $C_2$-$C_8$ perfluoroolefins;
(b) hydrogen-containing $C_2$-$C_8$ olefins;
(c) $C_2$-$C_8$ fluoroolefins comprising at least one of iodine, chlorine and bromine;
(d) (per)fluoroalkylvinylethers (PAVE) of formula $CF_2=CFOR_f$ wherein $R_f$ is a $C_1$-$C_6$ (per)fluoroalkyl group;
(e) (per)fluoro-oxy-alkylvinylethers of formula $CF_2=CFOX$, wherein X is a $C_1$-$C_{12}$ ((per)fluoro)-oxyalkyl comprising catenary oxygen atoms;

(f) (per)fluorodioxoles having formula:

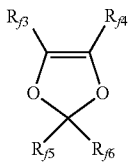

wherein each of $R_{f3}$, $R_{f4}$, $R_{f5}$, $R_{f6}$, equal to or different from each other, is independently selected from the group consisting of fluorine atom and $C_1$-$C_6$ (per)fluoroalkyl groups, optionally comprising one or more than one oxygen atom;

(g) (per)fluoro-methoxy-vinylethers having formula:

$$CF_2=CFOCF_2OR_{f2}$$

wherein $R_{f2}$ is selected from the group consisting of $C_1$-$C_6$ (per)fluoroalkyls; $C_5$-$C_6$ cyclic (per)fluoroalkyls; and $C_2$-$C_6$ (per)fluorooxyalkyls, comprising at least one catenary oxygen atom;

(h) $C_2$-$C_8$ non-fluorinated olefins (OI); and (2) TFE-based copolymers, in which TFE is copolymerized with the at least one monomer (CSM) and at least one additional comonomer selected from the group consisting of (c), (d), (e), (g), (h) and (i) as above detailed.

8. The composition (C) of claim 1, wherein the content of iodine and/or bromine in the fluoroelastomer (A) is at least 0.05% wt, with respect to the total weight of fluoroelastomer (A), and/or not exceeding 7% wt, with respect to the total weight of fluoroelastomer (A).

9. The composition (C) according to claim 1, wherein fluoroelastomer (A) is selected from the group consisting of those having iodine cure sites comprised as terminal groups and having following monomers composition (in mol %, with respect to the total moles of recurring units):

(i) tetrafluoroethylene (TFE): 50-80%; (per)fluoroalkyl-vinylethers (PAVE): 15 50%; monomer (CSM): 0.1-10%; bis-olefin (OF): 0-5%; or (ii) tetrafluoroethylene (TFE): 20-70%; (per)fluoro-methoxy-vinylethers (MOVE): 25-75%; (per)fluoroalkylvinylethers (PAVE): 0-50%; monomer (CSM) 0.1-10%; bis-olefin (OF): 0-5%.

10. The composition (C) of claim 1, wherein the peroxide (O) is selected from the group consisting of di(alkyl/alryl) peroxides; diacyl peroxides; percarboxylic acids and esters; and peroxycarbonates.

11. The composition of claim 1, wherein the amount of peroxide (O) in the composition (C) is from 0.1 to 5 phr, relative to 100 weight parts of fluoroelastomer (A).

12. A method for fabricating shaped articles comprising curing the composition (C), according to claim 1.

13. A cured article comprising a composition (C) of claim 1 in a cured form, said cured article being selected from the group consisting of sealing articles, O(square)-rings, packings, gaskets, diaphragms, shaft seals, valve stem seals, piston rings, crankshaft seals, cam shaft seals, oil seals, piping, tubings, flexible hoses, and conduits for delivery of hydrocarbon fluids and fuels.

14. A composition (C) of claim 1, wherein compound (CN-PFPE) complies with formula (III):

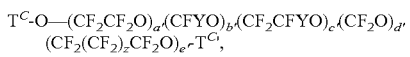

wherein:
Y is a $C_1$-$C_5$ perfluoro(oxy)alkyl group;
z is 1 or 2;
a', b', c', d', e' are integers ≥0;
each of $T^C$ and $T^{C'}$, equal to or different from each other, are selected from the group consisting of groups $T^{CN''}$ of any of formulae $-CF_2-CN$, $-CFZ^*CH_2-CN$, and $-CFZ^*-CH_2(OCH_2CH_2)_k$ $-CN$, wherein $Z^*$ is F or $CF_3$; k is ranging from 0 to 10.

15. The composition (C) according to claim 3, wherein agent (A) is selected from the group consisting of:
(Ag A-1) Urea of formula:

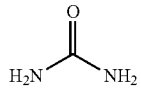

(Ag A-2) Acetaldehyde ammonia trimer of formula:

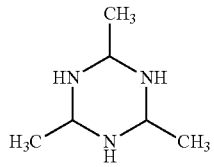

and
(Ag A-3) Benzyl carbamate of formula:

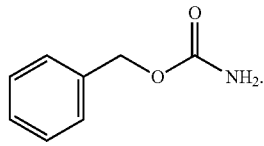 [SMILES: NC(=O)OCc1ccccc1]

16. The composition (C) of claim 5, wherein the compound (U) is selected from the group consisting of $H_2C=CH-(CF_2)_4-CH=CH_2$ or $H_2C=CH-(CF_2)_6-CH=CH_2$, $F_2C=CF-O-(CF_2)_5-O-CF=CF_2$, and tryallylisocyanurate.

17. The composition of claim 6, wherein said (per)fluorinated monomer is selected from the group consisting of tetrafluoroethylene (TFE); hexafluoropropene (HFP); vinyl fluoride; 1,2-difluoroethylene; vinylidene fluoride (VDF); trifluoroethylene (TrFE); pentafluoropropylene; hexafluoroisobutylene; chlorotrifluoroethylene (CTFE); fluoroalkylvinylethers complying with formula $CF_2=CFOR_{f1}$ in which $R_{f1}$ is $-CF_3$, $-C_2F_5$, or $-C_3F_7$; hydrofluoroalkylvinylethers complying with formula $CH_2=CFOR_{f1}$ in which $R_{f1}$ is $-CF_3$, $-C_2F_5$, or $-C_3F_7$; (per)fluoro-methoxy-vinylethers complying with formula $CF_2=CFOCF_2OR_{f2}$ in which $R_{f2}$ is $-CF_3$, $-C_2F_5$, $-C_3F_7$ or $-C_2F_5-O-CF_3$; and (per)fluorodioxoles of formula

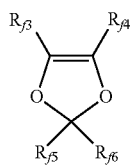

wherein each of $R_{f3}$, $R_{f4}$, $R_{f5}$, $R_{f6}$, equal to or different from each other, is independently —$CF_3$, —$C_2F_5$, —$C_3F_7$, —$OCF_3$, or —$OCF_2CF_2OCF_3$.

18. The composition (C) of claim 8, wherein the content of iodine and/or bromine in the fluoroelastomer (A) is at least 0.06% wt, with respect to the total weight of fluoroelastomer (A), and not exceeding 4% wt, with respect to the total weight of fluoroelastomer (A).

19. The composition (C) of claim 10, wherein the peroxide (O) is selected from the group consisting of di-tert-butyl peroxide, 2,5-dimethyl-2,5-bis(tert-butylperoxy)hexane, di(t-butylperoxyisopropyl)benzene, dicumyl peroxide, dibenzoyl peroxide, disuccinic acid peroxide, di(4-methylbenzoyl)peroxide, di(2,4-dichlorobenzoyl)peroxide, dilauroyl peroxide, decanoyl peroxide, di-tert-butyl perbenzoate, t-butylperoxy-2-ethylhexanoate, 1,1,3,3-tetramethylethylbutyl peroxy-2-ethylhexanoate, 2,5-dimethyl-2,5-di(2-ethylhexanoylperoxy)hexane, di(4-t-butylcyclohexyl)peroxydicarbonate, di(2-phenoxyethyl)peroxydicarbonate, bis[1,3-dimethyl-3-(tert-butylperoxy)butyl] carbonate, t-hexylperoxyisoprorylcarbonate, and t-butylperoxyisopropylcarbonate.

20. The composition of claim 11, wherein the amount of peroxide (O) in the composition (C) is from 0.2 to 4 phr, relative to 100 weight parts of fluoroelastomer (A).

* * * * *